United States Patent [19]

Ueno et al.

[11] Patent Number: 5,070,834

[45] Date of Patent: Dec. 10, 1991

[54] DIESEL ENGINE WITH A PRECOMBUSTION CHAMBER

[75] Inventors: Makoto Ueno, Suntou; Norihiko Nakamura, Mishima; Hideo Nagaosa, Susono, all of Japan

[73] Assignee: Toyota Jidosha Kabushiki Kaisha, Toyota, Japan

[21] Appl. No.: 577,121

[22] Filed: Sep. 4, 1990

[30] Foreign Application Priority Data

Dec. 18, 1989 [JP] Japan .................... 1-144896[U]

[51] Int. Cl.⁵ .................... F02B 19/00; F02M 39/00
[52] U.S. Cl. .................................. 123/275; 123/253
[58] Field of Search ................ 123/90.27, 253, 275

[56] References Cited

U.S. PATENT DOCUMENTS

| | | | |
|---|---|---|---|
| 3,035,559 | 5/1962 | Brandes et al. | 123/275 |
| 3,144,013 | 8/1964 | Peras | 123/260 |
| 3,420,215 | 1/1969 | Seifert | 123/275 |
| 4,319,548 | 3/1982 | Kruger | 123/90.27 |
| 4,418,655 | 12/1983 | Henning | 123/41.82 R |
| 4,440,125 | 4/1984 | Case | 123/293 |
| 4,840,147 | 6/1989 | Tanahashi et al. | 123/65 V D |

FOREIGN PATENT DOCUMENTS

| | | |
|---|---|---|
| 3243013 | 5/1984 | Fed. Rep. of Germany . |
| 3402605 | 8/1985 | Fed. Rep. of Germany . |
| 55-132343 | 9/1980 | Japan . |
| 55-144830 | 10/1980 | Japan . |
| 56-86317 | 7/1981 | Japan . |
| 62-152022 | 9/1987 | Japan . |
| 674713 | 9/1950 | United Kingdom . |

Primary Examiner—E. Rollins Cross
Assistant Examiner—Robert E. Mates
Attorney, Agent, or Firm—Oliff & Berridge

[57] ABSTRACT

A diesel engine comprising a plurality of cylinders each having a precombustion chamber and a fuel injector. A first camshaft for driving intake valves and a second camshaft for driving exhaust valves are arranged on the cylinder head and extended in parallel to the longitudinal axis of the engine body. Each precombustion chamber and each fuel injector is arranged centrally between the first camshaft and the second camshaft.

18 Claims, 4 Drawing Sheets

DIESEL ENGINE WITH A PRECOMBUSTION CHAMBER

BACKGROUND OF THE INVENTION

1. Field of the Invention

The present invention relates to a diesel engine with a precombustion chamber.

2. Description of the Related Art

In a known diesel engine equipped with a precombustion chamber, the precombustion chamber is normally arranged above and slightly offset from the end portion of the main combustion chamber, i.e., is positioned in a direction perpendicular to the longitudinal axis of the engine body (see, for example, Japanese Unexamined Utility Model Publication No. 62-152022).

Where, however, a pair of camshafts are used for driving an intake valve and an exhaust valve, if the precombustion chamber is arranged above and slightly offset from the end of the main combustion chamber, in the direction perpendicular to the longitudinal axis of the engine body as mentioned above, one of the camshafts is positioned close to the precombustion chamber and the other camshaft is remote from the precombustion chamber. In this case, since the temperature of the precombustion chamber becomes very high, if one of the camshafts is arranged close to the precombustion chamber and the other camshaft is remote from the precombustion chamber, the temperature of the camshaft close to the precombustion chamber, and the temperature of the bearing for the camshaft close to the precombustion chamber, become high due to a transfer of heat from the precombustion chamber. Accordingly, when the temperature of the camshaft and the temperature of the bearing of the camshaft become high, as mentioned above, the cams of the camshaft are thermally expanded, and thus the cam phases of the cams will become different from the required cam phases. As a result, a problem arises in that the opening and closing timing relationship between the intake valve or the exhaust valve driven by the camshaft close to the precombustion chamber and having a high temperature, and the intake valve or the exhaust valve driven by the camshaft remote from the precombustion chamber and having a relatively low temperature, will not meet the required opening and closing timing relationship. Further, as mentioned above, if the temperature of only one of the camshafts and the temperature of the bearing of that camshaft become high, that camshaft and the bearing thereof are subjected to considerable changes in temperature when the engine is repeatedly operated and stopped, and as a result, a problem arises in that the operating life of the overheated camshaft and bearing thereof will be shorter than that of the remote camshaft and bearing thereof.

Furthermore, in a direct injection type Diesel engine, the fuel injectors do not project from the cylinder head to a great extent, but in a Diesel engine equipped with a precombustion chamber, since the fuel injector is arranged above the precombustion chamber, the fuel injector is projected far from the cylinder head. In this case, where the precombustion chamber is arranged above and slightly offset from the end of the main combustion chamber, perpendicular to the longitudinal axis of the engine body as mentioned above, the fuel injector is laterally projected far from the cylinder head. If the fuel injector is laterally projected far from the cylinder head, there is a much greater chance that the fuel injector and the piping thereof will come into contact with other parts of the engine, and as a result, a problem arises in that the fuel injector and the piping thereof will be damaged.

SUMMARY OF THE INVENTION

An object of the present invention is to provide a Diesel engine equipped with a precombustion chamber and able to maintain a stable operation for a long time.

According to the present invention, there is provided a Diesel engine having a cylinder head and a plurality of cylinders arranged in series along a longitudinal axis of the engine, the Diesel engine comprising: a first camshaft for operating intake valves and arranged on the cylinder head while offset to one side of, and substantially in parallel to, the longitudinal axis of the engine; a second camshaft for operating exhaust valves and arranged on the cylinder head at a side thereof opposite to the first camshaft with respect to, and extending substantially in parallel to, the longitudinal axis of the engine; main combustion chambers provided for corresponding cylinders; precombustion chambers provided for corresponding cylinders and arranged in the cylinder head between the first camshaft and the second camshaft; and fuel injectors provided for corresponding precombustion chambers and arranged between the first camshaft and the second camshaft.

The present invention may be more fully understood from the description of preferred embodiments of the invention set forth below, together with the accompanying drawings.

DESCRIPTION OF THE PREFERRED EMBODIMENTS

Figure 1:
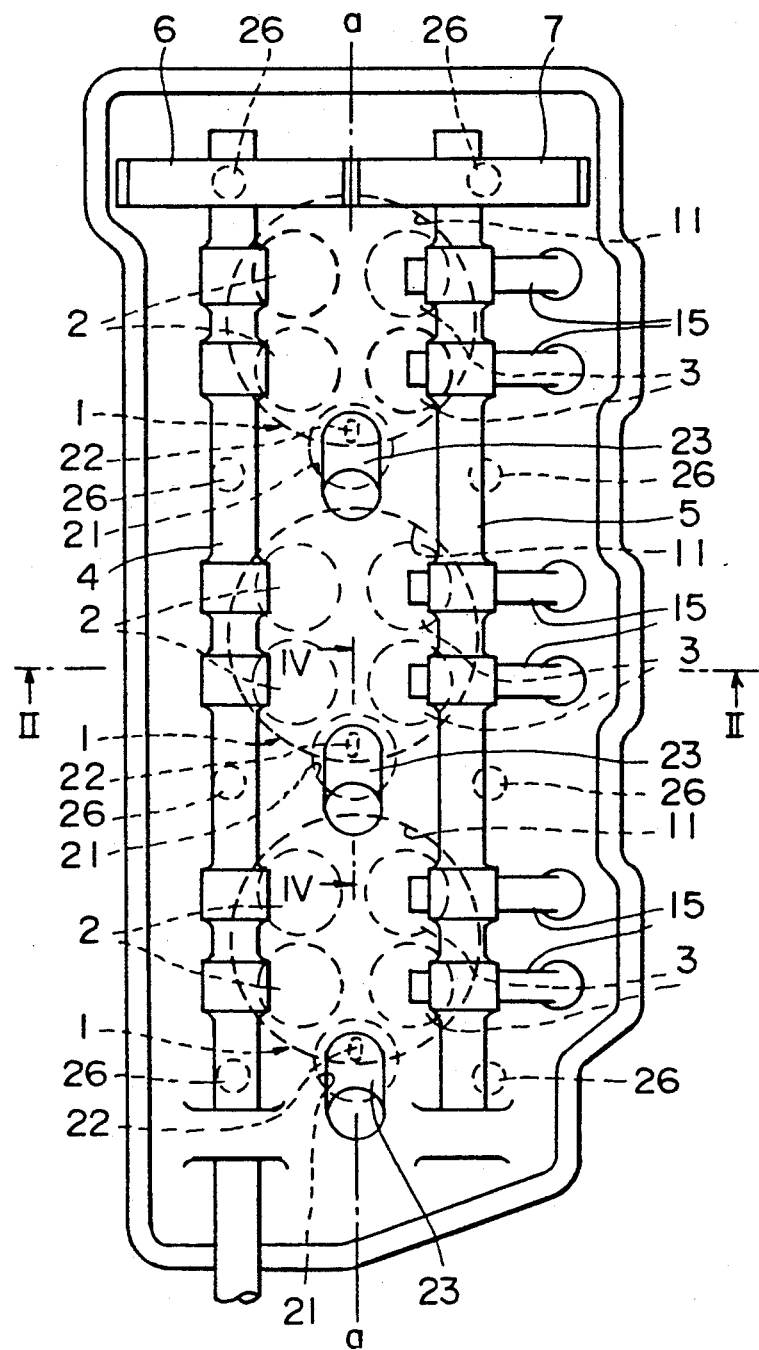
FIG. 1 is a plan view of a two stroke Diesel engine.
Figure 2:
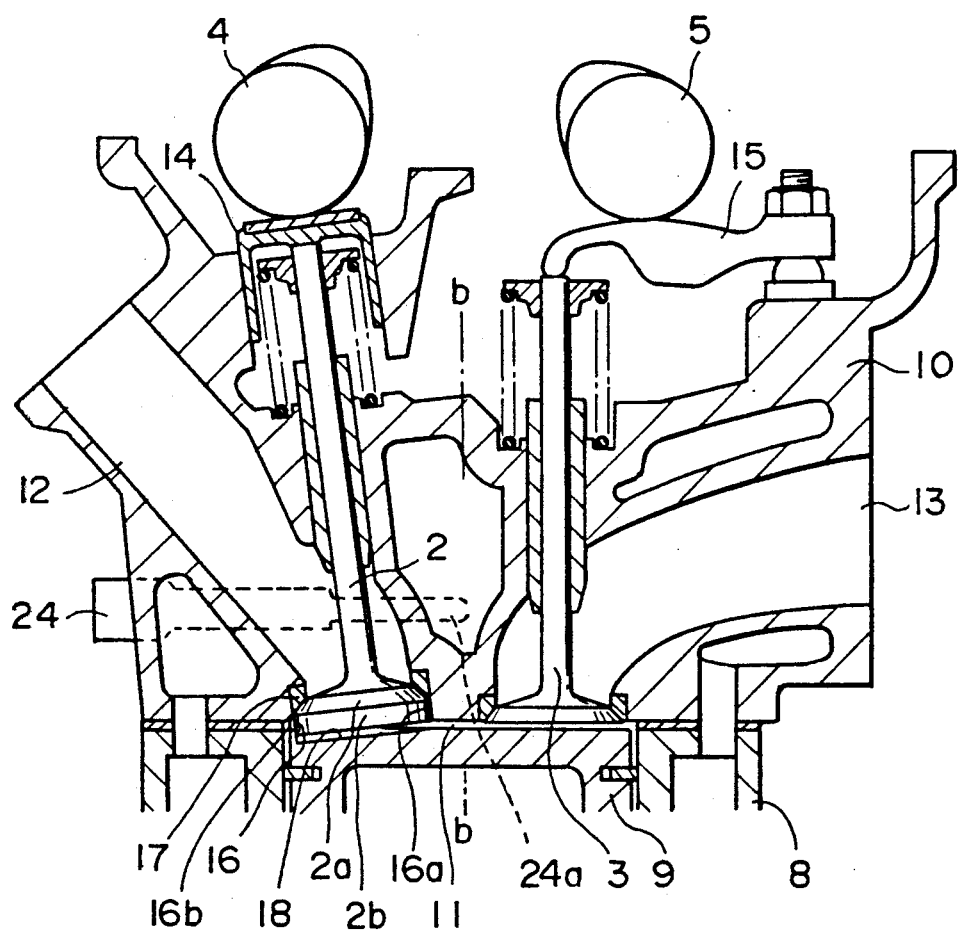
FIG. 2 is a cross-sectional view of the engine, taken along the line II—II in FIG. 1.
Figure 3:
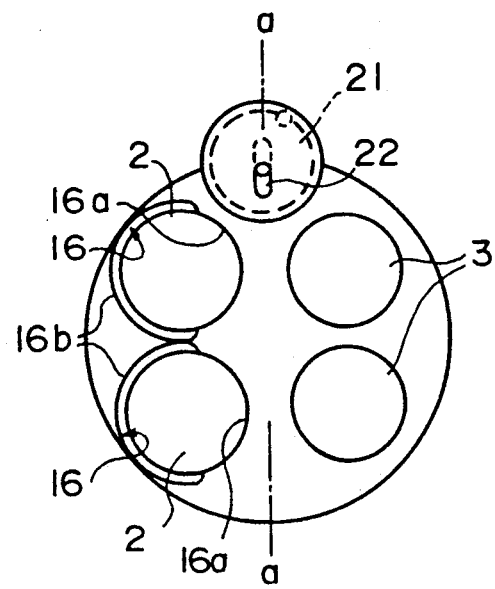
FIG. 3 is a bottom view of the inner wall of the cylinder head.

FIGS. 1 through 3 illustrate the present invention when applied to a two stroke diesel engine.

FIG. 1 illustrates one block of a V-type six-cylinder two-stroke Diesel engine, and thus three cylinders 1 are provided in this block. Each cylinder 1 comprises a pair of intake valves 2 and a pair of exhaust valves 3. The intake valves 2 of the cylinders 1 are arranged in a plane extending in parallel to the longitudinal axis a—a of the engine body and are driven by a camshaft 4 extended along the longitudinal axis a—a of the engine body. The exhaust valves 3 of the cylinders 1 are also arranged in a plane extending in parallel to the longitudinal axis a—a of the engine body and are driven by another camshaft 5 extended along the longitudinal axis a—a of the engine body. The camshaft 4 and the camshaft 5 are interconnected via a pair of meshing gears 6 and 7 fixed to the ends of the camshafts 4 and 5, respectively, and the camshaft 4 is connected to the crankshaft (not shown) via a timing belt.

FIG. 2 illustrates a cross-sectional view of the engine, taken along the line II—II in FIG. 1.

Referring to FIG. 2, reference numeral 8 designates a cylinder block, 9 a piston reciprocally movable in the cylinder block 8, 10 a cylinder head fixed to the cylinder block 8, 11 a main combustion chamber formed between the top face of the piston 9 and the flat inner wall of the cylinder head 10, 12 designates an intake port, and 13 an exhaust port. The intake valve 2 is obliquely arranged relative to the axis b—b of the cylinder bore so that the upper portion of the intake valve 2 is farther from the axis b—b of the cylinder bore than the lower portion of the intake valve 2, and the intake valve 2 is driven by the camshaft 4, arranged on the axis of the intake valve 2, via a valve lifter 14 slidably inserted in the cylinder head 10. The exhaust valve 3 is arranged substantially in parallel to the axis b—b of the cylinder bore and driven by the camshaft 5 via a rocker arm 15.

A depression 16 is formed on the inner wall of the cylinder head 10 around the intake valve 2, and a valve seat 17 for the intake valve 2 is arranged deep in the interior of the depression 16. The intake valve 2 comprises a conical shaped valve seat portion which is seated on the valve seat 17, and a cylindrical portion 2b which extends from the lower peripheral portion of the valve seat portion 2a toward the piston 9. As illustrated in FIGS. 2 and 3, the depression 16 comprises a cylindrical peripheral wall portion 16a slightly spaced from the cylindrical portion 2b of the intake valve 2 and extending along the cylindrical portion 2b of the intake valve 2, which is located on the adjacent exhaust valve side, and a conical peripheral wall portion 16b diverged conically downward from the valve seat 17 at a position opposite to the cylindrical peripheral wall portion 16a. Therefore, when the amount of lift of the intake valve 2 is small or, in some cases, during the entire opening period of the intake valve 2, at least part of the cylindrical portion 2a of the intake valve 2 faces at least part of the cylindrical peripheral wall portion 16a, and at this time, an inflow of air to the main combustion chamber 11 via the clearance between the cylindrical peripheral wall portion 16a and the cylindrical portion 2a of the intake valve 2 is prevented. Consequently, the cylindrical peripheral wall portion 16a forms a masking wall preventing the inflow of air from the opening of the intake valve 2, which is located on the adjacent exhaust valve side when the amount of lift of the intake valve 2 is small or, in some cases, during the entire opening period of the intake valve 2. As illustrated in FIG. 2, a recess 18 is formed on the top face of the piston 9, so that the piston 9 and the intake valve 2 will not interfere with each other when the piston 9 reaches the top dead center. The exhaust valve 3 is arranged so that the front face of the valve head thereof is located at the same level as the inner wall of the cylinder head 10.

Figure 4:
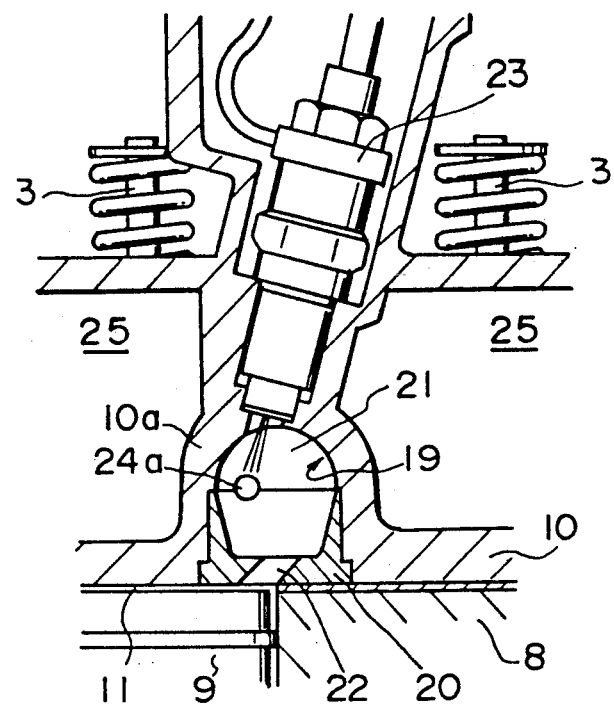
FIG. 4 is a cross-sectional view of the engine, taken along the line IV—IV in FIG. 1.

As illustrated in FIG. 4, a recess 19 is formed in the cylinder head 10 above the end portion of the main combustion chamber 11, and a chamber member 20 is inserted in the recess 19 from the inner wall side of the cylinder head 10. The chamber member 20 is stationarily held between the cylinder block 8 and the cylinder head 10, and a precombustion chamber 21, i.e., a swirl chamber in the embodiment illustrated in FIG. 4, is formed in the recess 19. The precombustion chamber 21 is in communication with the main combustion chamber 11 via an opening 22 formed in the chamber member 20, and a fuel injector 23 is arranged at the top of the precombustion chamber 21 to inject fuel toward the precombustion chamber 21. As illustrated in FIG. 2, a glow plug 24 is inserted in the cylinder head 10 from the lateral side thereof, and as illustrated in FIG. 4, the tip portion 24a of the glow plug 24 projects into the precombustion chamber 21. Fuel is injected by the fuel injector 23 toward the tip portion 24a of the glow plug 24. As illustrated in FIG. 4, a cooling water passage 25 is formed around the precombustion chamber 21 and the fuel injector 23 via a thin wall 10a, and thus the precombustion chamber 21 and the fuel injector 23 are sufficiently cooled by the cooling water.

As illustrated in FIGS. 1 and 3, the paired intake valves 2 of each cylinder 1 are arranged opposite to the paired exhaust valves 3 of each cylinder 1 with respect to the longitudinal axis a—a of the engine body, and the precombustion chamber 21, the opening 22, and the fuel injector 23 of each cylinder 1 are arranged on the longitudinal axis a—a of the engine body. As can be seen from FIG. 1, the precombustion chamber 21, the opening 22, and the fuel injector 23 are arranged at the end portion on the same side of each cylinder 1, and thus two of these precombustion chambers 21, two of the openings 22, and two of the fuel injectors 23 are arranged between the adjacent cylinders 1. Each opening 22 is directed to a point between the corresponding paired intake valves 2 and the corresponding paired exhaust valves 3 in FIG. 1, and thus the burning gas is injected from each opening 22 to a point between the corresponding paired intake valves 2 and the corresponding paired exhaust valves 3 in FIG. 1.

As illustrated in FIG. 1, a pair of camshafts 4 and are symmetrically arranged with respect to the longitudinal axis a—a of the engine body, and thus the precombustion chamber 21, the opening 22, and the fuel injector 23 for each cylinder 1 are arranged substantially centrally between the camshafts 4 and 5. As mentioned above, since the precombustion chambers 21 are arranged substantially centrally between the camshafts 4 and 5, heat generated in the precombustion chambers 21 is substantially equally transferred to the camshafts 4 and 5. As a result, since the amount of the thermal expansion of the camshaft 4 is substantially equal to the thermal expansion of the camshaft 5, the relationship between the opening and closing timing of the intake valves 2 and the opening and closing timing of the exhaust valves 3 is maintained at the required opening and closing relationship. Further, since the heat generated in the precombustion chambers 21 is substantially equally transferred to the camshafts 4 and 5, a shortening of the life of only one of the camshafts due to thermal deterioration is prevented, and a more rapid wear of only one of the camshafts is also prevented. Furthermore, the fuel injectors 23 are arranged between the camshafts 4 and 5, and thus the fuel injectors 23 are protected by the pair of camshafts 4 and 5 so that the fuel injectors 23 cannot come into contact with other parts of the engine.

Although not shown in the drawings, the cylinder head 10 is covered by a head cover, and thus the fuel injectors 23 and the pipings thereof are further protected by this head cover. In addition, as illustrated by the broken line in FIG. 1, head bolts 26 for fixing the cylinder head 10 to the cylinder block 8 are arranged symmetrically with respect to the longitudinal axis a—a of the engine body, on each side of the precombustion chamber 21 of each cylinder 1, and consequently, since the heat generated in the precombustion chambers 21 is equally transferred to the head bolts 26, almost no difference exists among the forces of the head bolts 26 fixing the cylinder head 10 to the cylinder block 8.

Therefore, it is possible to completely prevent a leakage of burned gas from between the cylinder head 10 and the cylinder block 8. Furthermore, since almost no difference exists among the forces of the head bolts 26 fixing the cylinder head 10 to the cylinder block 8, as mentioned above, and the head bolts 26 are arranged on each side of the precombustion chamber 21, the chamber members 20 (FIG. 4) are firmly held between the cylinder head 10 and the cylinder block 8.

During the operation of the engine, when the piston 9 moves upward and begins to compress air in the main combustion chamber 11, the air in the main combustion chamber 11 is forced into the precombustion chamber 21 via the opening 22, and the air forced into the precombustion chamber 21 is caused to swirl in the precombustion chamber 21. Thereafter, when the piston 9 reaches the vicinity of the top dead center, fuel is injected by the fuel injector 23 and this fuel is burned in the precombustion chamber 21. Then burning gas is spouted from the opening 22 into the main combustion chamber 11, together with an unburned air-fuel mixture, and this unburned air-fuel mixture is burned in the main combustion chamber 11. Then, when the piston 9 moves downward and the exhaust valves 3 are opened, the burned gas in the main combustion chamber 11 is quickly discharged into the exhaust ports 13. Since a pair of the exhaust valves 3 are provided for each cylinder 1, the total flow area of the openings of the exhaust valves 3 is large, and consequently, when the exhaust valves 3 are opened, the pressure in the main combustion chamber 11 instantaneously drops. As a result, burned gas in the precombustion chamber 21 flows out into the main combustion chamber 11, and the pressure in the precombustion chamber 21 also instantaneously drops.

When the intake valves 2 are opened, air pressurized by the supercharger (not shown) is forced into the main combustion chamber 11 from the intake ports 12. As mentioned above, the openings of the intake valves 2, located on the side adjacent the exhaust valves, are masked by the cylindrical peripheral wall portions, i.e., the masking walls 16a of the corresponding depressions 16. Therefore, when the intake valves 2 are opened, air passes through the openings of the intake valves 2, on the side away from exhaust valves, and then flows into the main combustion chamber 11, as illustrated by the arrow $F_1$ in FIG. 5. Thereafter, as illustrated by the arrow $F_2$ in FIG. 5, the air flows downward along the inner wall of the cylinder beneath the intake valves 2, flows along the top face of the piston 9, and then flows upward along the inner wall of the cylinder beneath the exhaust valves 3. In this way, since the air flows within the main combustion chamber 11 in the form of a loop shape, the burned gas remaining in the main combustion chamber 11 is pushed out into the exhaust ports 13, and thus a good scavenging operation in the main combustion chamber 11 can be obtained. Note that, even with the masking walls 16a, since a pair of intake valves 2 is provided for each cylinder 1, the total flow area of the openings of the intake valves 2 is sufficiently large that a sufficient amount of air can be forced into the main combustion chamber 11.

When the piston 9 begins to move upward, the exhaust valves 3 are closed and then the intake valves 2 are closed. At this time, air in the main combustion chamber 11 begins to flow into the precombustion chamber 21 via the opening 22.

Figure 5:
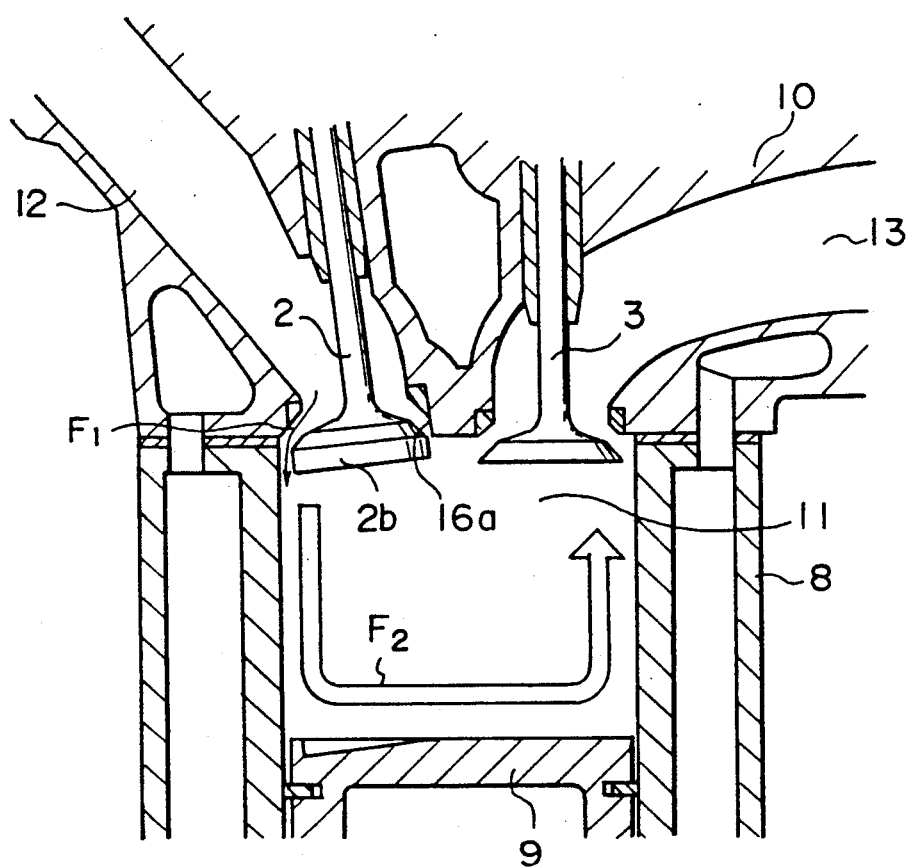
FIG. 5 is a view illustrating the piston during the downward stroke thereof.

As mentioned above, when the intake valves 2 are opened, air flows into the main combustion chamber 11 via the openings the intake valves 2, which are located on the side adjacent the exhaust valves, i.e., via the clearance between the cylindrical portion 2b of the intake valve 2 and the conical peripheral wall portion 16b of the depression 16. In this case, if the intake valve 2 is extended in parallel with the axis b—b of the cylinder bore, the gap between the cylindrical portion 2b of the intake valve 2 and the inner wall of the cylinder is maintained at a constant small value, regardless of the amount of lift of the intake valve 2, and thus air is not able to flow easily along the inner wall of the cylinder beneath the intake valve 2, as illustrated by the arrows $F_1$ and $F_2$. However, in the embodiment according to the present invention, as illustrated in FIGS. 2 and 5, since the intake valve 2 is obliquely arranged with respect to the axis b—b of the cylinder bore, the gap between the cylindrical portion 2b of the intake valve 2 and the inner wall of the cylinder becomes gradually larger as the amount of lift of the intake valve 2 is increased. Consequently, since air can easily flow, as illustrated by the arrows $F_1$ and $F_2$, a strong loop scavenging operation can be obtained. In addition, even if the depression 16 is formed on the inner wall of the cylinder head 10, this depression 16 is occupied by the cylindrical portion 2b of the intake valve 2, and thus there is no danger of an increase of the volume of the main combustion chamber 11.

As will be obvious to a person skilled in the art, the present invention can be also applied to a four-stroke Diesel engine equipped with a precombustion chamber.

According to the present invention, it is possible to maintain the timing relationship of the opening and closing of the intake valve and the exhaust valve at the required opening and closing timing relationship, and to prevent an earlier thermally deterioration of only one of the camshafts. In addition, it is possible to prevent the fuel injector from coming into contact with other parts of the engine, and thus being damaged.

Although the invention has been described with reference to specific embodiments chosen for purposes of illustration, it should be apparent that numerous modifications can be made thereto by those skilled in the art without departing from the basic concept and scope of the invention.

We claim:

1. A Diesel engine having a cylinder head and a plurality of cylinders arranged in series along a longitudinal axis of the engine, said Diesel engine comprising:
    a first camshaft for operating intake valves and arranged on the cylinder head on one side of and extending substantially in parallel to the longitudinal axis of the engine;
    a second camshaft for operating exhaust valves and arranged on the cylinder head opposite to said first camshaft with respect to and extending substantially in parallel to the longitudinal axis of the engine;
    main combustion chambers provided for corresponding cylinders;
    precombustion chambers provided for the corresponding cylinders and arranged in the cylinder head between said first camshaft and said second camshaft, said precombustion chambers being arranged at end portions of the corresponding cylinders, each on the same side of the cylinder; and fuel injectors provided for said corresponding precombustion chambers and arranged between said first camshaft and said second camshaft.

2. A Diesel engine according to claim 1, wherein said precombustion chambers and said fuel injectors are arranged substantially centrally between said first camshaft and said second camshaft.

3. A Diesel engine according to claim 2, wherein said precombustion chambers are connected to said corresponding main combustion chambers via corresponding openings for spouting burning gas, and said openings are arranged substantially centrally between said first camshaft and said second camshaft.

4. A Diesel engine according to claim 1, wherein each cylinder comprises a pair of intake valves driven by said first camshaft and arranged on one side of the longitudinal axis of the engine.

5. A Diesel engine according to claim 4, wherein each cylinder comprises a pair of exhaust valves driven by said second camshaft and arranged at a side opposite to said pair of intake valves with respect to the longitudinal axis of the engine.

6. A Diesel engine according to claim 5, wherein said precombustion chambers are connected to the corresponding main combustion chambers via corresponding openings for spouting burning gas, and said openings are directed such that the burning gas spouted therefrom passes between said pair of intake valves and said pair of exhaust valves.

7. A Diesel engine having a cylinder head and a plurality of cylinders arranged in series along a longitudinal axis of the engine, said Diesel engine comprising:
at least one intake valve in each cylinder;
at least one exhaust valve in each cylinder, said at least one intake valve and said at least one exhaust valve being arranged on each side of the longitudinal axis of the engine;
a first camshaft for driving said at least one intake valve of each cylinder and arranged on the cylinder head on one side of and extending substantially parallel to the longitudinal axis of the engine;
a second camshaft for driving said at least one exhaust valve of each cylinder and arranged on the cylinder head opposite to said first camshaft with respect to and extending substantially parallel to the longitudinal axis of the engine;
a main combustion chamber provided for each cylinder;
a precombustion chamber is provided for each cylinder and is arranged in the cylinder head between said first camshaft and said second camshaft; and
a fuel injector is provided for each said precombustion chamber and arranged between said first camshaft and said second camshaft, wherein said at least one exhaust valve is extended substantially in parallel to an axis of each cylinder and said at least one intake valve is obliquely arranged relative to the axis of each cylinder so that an upper portion of the intake valve is farther from the axis of the cylinder than a lower portion of the intake valve, said intake valve being driven by said first camshaft which is arranged on an axis of said intake valve and said exhaust valve is driven by said second camshaft which is far from an axis of said exhaust valve.

8. A Diesel engine according to claim 7, wherein said intake valve is driven by said first camshaft via a valve lifter slidably inserted into the cylinder head, and said exhaust valve is driven by said second camshaft via a rocker arm.

9. A Diesel engine according to claim 7, wherein said first camshaft has a gear fixed thereto, and said second camshaft has a gear fixed thereto and in mesh with the gear of said first camshaft.

10. A Diesel engine according to claim 7, wherein a masking wall is formed on an inner wall of the cylinder head, to mask an opening of said intake valve, said opening being located on the exhaust valve side.

11. A Diesel engine according to claim 10, wherein a depression is formed in the inner wall of the cylinder head to receive said intake valve therein, and said depression comprises a cylindrical peripheral wall portion located on the exhaust valve side and forming said masking wall, and a conical peripheral wall portion conically diverged toward said corresponding main combustion chamber at a position opposite to said cylindrical peripheral wall portion.

12. A Diesel engine according to claim 11, wherein said at least one intake valve comprises a valve seat portion and a cylindrical portion projecting from said valve seat portion toward said main combustion chamber and facing said cylindrical peripheral wall portion of said depression.

13. A Diesel engine according to claim 12, wherein said at least one intake valve is obliquely arranged relative to an axis of the cylinder so that an upper portion of said intake valve is farther from the axis of the cylinder than a lower portion of said intake valve.

14. A Diesel engine according to claim 12, wherein each cylinder comprises a piston having a top face, and a recess is formed on said top face of said piston to thereby receive the cylindrical portion of said intake valve.

15. A Diesel engine according to claim 1, wherein the cylinder head is fixed to a cylinder block by a plurality of head bolts, and a pair of said head bolts are arranged on the cylinder head symmetrically with respect to the longitudinal axis of the engine on each side of each precombustion chamber.

16. A Diesel engine according to claim 1, wherein each precombustion chamber has a glow plug arranged therein and laterally inserted into the cylinder head from a side of the cylinder head.

17. A Diesel engine according to claim 1, wherein each of the precombustion chambers and each of the fuel injectors is surrounded by a cooling water passage via a thin wall.

18. A Diesel engine having a cylinder head and a plurality of cylinders arranged in series along a longitudinal axis of the engine, said Diesel engine comprising:
a first camshaft for operating intake valves and arranged on the cylinder head on one side of, and extending substantially in parallel to, the longitudinal axis of the engine;
a second camshaft for operating exhaust valves and arranged on the cylinder head opposite to said first camshaft with respect to, and extending substantially in parallel to, the longitudinal axis of the engine;
main combustion chambers provided for corresponding cylinders;
precombustion chambers provided for the corresponding cylinders and arranged in the cylinder head between said first camshaft and said second camshaft; and
fuel injectors provided for said corresponding precombustion chambers and arranged between said first camshaft and said second camshaft, wherein each precombustion chamber has a glow plug arranged therein and laterally inserted into the cylinder head from a side of the cylinder head.

* * * * *